United States Patent [19]

Murray et al.

[11] Patent Number: 5,686,502
[45] Date of Patent: Nov. 11, 1997

[54] WATER BLOWN, HYDROPHILIC, OPEN CELL POLYURETHANE FOAMS, METHOD OF MAKING SUCH FOAMS AND ARTICLES MADE THEREFROM

[75] Inventors: Pat L. Murray, Spring; E. Richard Huber, Houston, both of Tex.

[73] Assignee: Polyfoam Products, Inc., Spring, Tex.

[21] Appl. No.: 667,633

[22] Filed: Jun. 24, 1996

Related U.S. Application Data

[63] Continuation of Ser. No. 193,618, Feb. 8, 1994, abandoned, which is a continuation of Ser. No. 907,386, Jul. 1, 1992, abandoned.

[51] Int. Cl.$^6$ .............................. C08J 9/08; C08G 18/32; C08G 18/48
[52] U.S. Cl. .................... 521/174; 521/130; 521/176; 521/905; 521/914
[58] Field of Search ..................... 521/174, 176, 521/905, 914, 130

[56] References Cited

U.S. PATENT DOCUMENTS

| | | | |
|---|---|---|---|
| 3,336,242 | 8/1967 | Hampson et al. | 521/174 |
| 3,746,666 | 7/1973 | Neal et al. | 521/167 |
| 3,793,241 | 2/1974 | Kyle et al. | 521/159 |
| 3,865,762 | 2/1975 | Repiquet et al. | 521/174 |
| 4,008,189 | 2/1977 | Leuwen et al. | 521/174 |
| 4,125,691 | 11/1978 | White | 521/176 |
| 4,137,200 | 1/1979 | Wood et al. | 521/159 |
| 4,144,386 | 3/1979 | Consoli et al. | 521/160 |
| 4,193,887 | 3/1980 | Stone et al. | 521/905 |
| 4,302,552 | 11/1981 | Hongu et al. | 521/176 |
| 4,365,025 | 12/1982 | Murch et al. | 521/159 |
| 4,384,050 | 5/1983 | Guthrie | 521/137 |
| 4,384,051 | 5/1983 | Guthrie | 521/137 |
| 4,385,133 | 5/1983 | Alberino et al. | 521/176 |
| 4,426,462 | 1/1984 | Weissenfels et al. | 521/116 |
| 4,692,477 | 9/1987 | Jacobina | 521/174 |
| 4,826,885 | 5/1989 | Tsai | 521/176 |
| 4,945,149 | 7/1990 | Matsumoto et al. | 528/61 |
| 5,010,117 | 4/1991 | Herrington et al. | 521/174 |
| 5,059,633 | 10/1991 | Lutter et al. | 521/174 |
| 5,063,253 | 11/1991 | Gansen et al. | 521/174 |
| 5,318,997 | 6/1994 | Okada et al. | 521/174 |
| 5,420,170 | 5/1995 | Lutter et al. | 521/159 |

FOREIGN PATENT DOCUMENTS 737306   11/1970   Belgium.

*Primary Examiner*—Rabon Sergent
*Attorney, Agent, or Firm*—Pravel, Hewitt, Kimball & Krieger

[57] ABSTRACT

Disclosed is a water blown, open cell, hydrophilic polyurethane foam, a process for preparing such a foam and articles made therefrom. Utilizing a one step process the foam is formed from a reaction mixture comprising an organic polyisocyanate, water, a reaction catalyst and a mixture of certain polyols. The first polyol utilized in the invention is a poly(oxyalkylene) triol, chain terminated with propylene oxide and having a molecular weight in the range of about 2800 to about 6200. The second polyol is a poly(oxyalkylene) polyol, chain terminated with ethylene oxide or propylene oxide and having a molecular weight in the range of about 60 to about 800. The third polyol comprises at least one selected from the group of (i) poly(oxyalkylene) diols chain terminated with ethylene oxide and having a molecular weight in the range of about 500 to about 4000 and (ii) polyfunctional polyols chain terminated with propylene oxide and having a molecular weight in the range of about 250 to about 1000.

24 Claims, No Drawings

WATER BLOWN, HYDROPHILIC, OPEN CELL POLYURETHANE FOAMS, METHOD OF MAKING SUCH FOAMS AND ARTICLES MADE THEREFROM

This application is a continuation of application Ser. No. 08/193,618 filed Feb. 8, 1994 now abandoned, which is a continuation of application Ser. No. 07/907,386 filed on Jul. 1, 1992 now abandoned.

BACKGROUND OF THE INVENTION

1. Field of the Invention

The present invention relates to foams, to a process for making foams and to products made therefrom. In another aspect, the present invention relates to polyurethane foams, a process for making polyurethane foams, and to products made from such foams. In still another aspect, the present invention relates to hydrophilic, open cell, polyurethane foams, to a single step, water blown process for making such polyurethane foams, and to products made from such foams.

2. Brief Description of the Related Art

Foamed plastics, also known as cellular plastics or plastic foams, find utility in many varied applications. For example, they find utility as insulation, baffles, filters, shoe insoles, cushions and mattresses. The pliability of such plastics can vary from rigid to flexible or any variation in between. Foamed plastics can also be hydrophilic or hydrophobic.

Foamed plastics have a cellular structure in which the apparent density is decreased by the presence of numerous cells disposed throughout the plastic. The gas phase in a cellular polymer is usually distributed in voids or pockets called cells. If the cells are interconnected in such a manner that gas can pass from one to another, the material is termed open-celled. If the cells are discrete and the gas phase of each cell is independent of that of the other cells, the material is termed closed celled.

Urethane polymers are one type of foamed plastic. These polymers were first formed in the 1930's by addition polymerization of diisocyanates with macroglycols. Today, the general chemical ingredients of a polyurethane foam system are a polyfunctional isocyanate and a hydroxyl-containing polymer, along with the catalysts necessary to control the rate and type of reaction and other additives to control the surface chemistry of the process.

The most common types of blowing agents for urethane foams are water or volatile fluids such as halocarbons. While water is called the blowing agent, in fact it is carbon dioxide that acts as the blowing agent, as it is generated in situ by the reaction of isocyanate with water. When liquid halocarbons are utilized, they produce a gas as the foaming mixture heats up. A portion of the blowing gas (from water or liquid halocarbons) remains in the foam and their presence as gas in the cells lowers the thermal conductivity of the foam considerably.

The general method of producing a cellular polyurethane is to mix the polyfunctional isocyanate, hydroxyl containing polymer catalysts, blowing agents and other additives and adjust process conditions and ratios of the reactants such that the heat from the reaction causes expansion of the blowing agent resulting in the creation of a foam. The stabilization of the polymer, generally by cross-linking, is timed to coincide at the time corresponding to minimum density of the resultant foam.

The resultant polyurethane foams can vary broadly in molecular weight and physical properties depending on the degree of cross-linking as well as the structure of the foam. The average molecular weight between cross-links is generally 400–700 for rigid polyurethane foams, 700–2,500 for semirigid foams, and 2,500–25,000 for flexible polyurethane foams.

Commercially, polyurethane foams are generally produced utilizing one of two fundamentally different methods, generally known as the "one-shot" method and the "prepolymer" or "two-step" method.

In a one-step process all the polyurethane foam ingredients are mixed and then discharged from the mixer to form the foam. The reactions begin immediately and proceed at such a rate that expansion starts quickly, usually in less than 10 seconds. The expansion generally takes a few minutes. Curing may continue for several days.

In the two-step or prepolymer process the polyhydroxy component is reacted with an amount of polyisocyanate sufficient to form a prepolymer with isocyanate end groups plus excess isocyanate. The prepolymer mixture is then reacted with a resin blend which may include a blowing agent such as water or organic blowing agents. When water is utilized as the blowing agent, reaction of the water with the prepolymer causes the release carbon dioxide for expansion of the foam.

The following are examples of two-step processes for making polyurethane foams.

U.S. Pat. No. 3,793,241, issued Feb. 19, 1974, to Kyle et al. discloses a two-step process for producing an open-celled polyoxyalkylene urea/urethane foam comprising hydrophilic and hydrophobic segments of relatively high molecular weight. The foams comprise high molecular weight ethylene oxide hydrophilic chains and high molecular weight propylene oxide hydrophobic chains with ethylene capping.

U.S. Pat. No. 4,137,200, issued Jan. 30, 1979 to Wood et al. discloses a two-step process in which hydrophilic crosslinked polyurethane foams may be prepared by reacting a particular isocyanate-capped polyoxyethylene polyol with large amounts of an aqueous reactant. The '200 patent further teaches that the prepolymer may be formed from mixtures or blends of various polyols and/or polyisocyanates.

U.S. Pat. No. 4,365,025, issued Dec. 21, 1982, to Murch et al. discloses a two-step process for making flexible polyurethane foams from isocyanate containing prepolymers, wherein the isocyanate is a mixture of diphenylmethane diisocyanate (MDI) and polymeric forms of MDI. The prepolymer is disclosed as being an isocyanate capped polyol or mixture of polyols where the polyols are diols or triols having at least 50 weight percent oxyethylene groups.

U.S. Pat. Nos. 4,384,050 and 4,384,051, both issued May 17, 1983, both to Guthrie, disclose a two-step process for making a flexible polyurethane foam based on diphenylmethane diisocyanate (MDI). The '050 patent discloses a prepolymer consisting of mixtures of diols having molecular weights in the range of 1000 to 2000. The '051 patent discloses prepolymers consisting of a diol of molecular weight less than 1000, a polyol with molecular weight on the order of at least 500, a triol of approximately 900 molecular weight and a triol of approximately 1400 molecular weight.

U.S. Pat. No. 4,945,149, issued Jul. 31, 1990 to Matsumoto et al. discloses a two-step process for making a hydrophilic polyurethane resin utilizing an epoxy based polyol system.

The following are examples of one-step processes for making polyurethane foams.

U.S. Pat. No. 3,746,666, issued Jul. 17, 1973, to Neal et al. discloses a one-step, volatile organically blown, process for making a water absorbable rigid urethane foam from a highly branched amine initiated polyether polyol, a highly branched hydroxyl initiated polyether polyol, and a lightly branched hydroxyl initiated polyether polyol and a polymethylene polyphenyl isocycanate.

U.S. Pat. No. 4,008,189, issued discloses a one-step process for making hydrophilic polyurethane foams utilizing three polyol reactants having molecular weights in the range of about 3000–5000, 2000–5000 and 2400–5000, respectively.

BE-0737306 discloses a one-step process for making hydrophilic polyurethane foams utilizing two polyol reactants having molecular weights of greater than 800 and in the range of about 200–500, respectively.

Today's environmental concerns dictate that polyurethane foams be made without the use of volatile organic blowing agents that are damaging to the environment, such as liquid halocarbons. Environmental and health concerns also dictate that polyurethane foams be made without resorting to the use of toluene diisocycanate (TDI). In addition, in many applications, one-step processes are preferred for their ease of use, economic reasons or both.

Additionally, there exists the need in the prior art for a process for a one-step, water blown process for making a hydrophilic, open-cell polyurethane foam.

SUMMARY OF THE INVENTION

According to one embodiment of the present invention there is provided a single step process for preparing a water blown, open cell, hyrophilic polyurethane. Utilizing a one-step process according to the invention, the foam is formed from a reaction mixture including an organic polyisocyanate, water, a catalyst, and a mixture of certain diols and polyols. The first polyol used in the reaction mixture of the invention is a poly(oxyalkylene) triol that is chain terminated with propylene oxide and that has a molecular weight in the range of about 2800 to about 6200. The second hydric component of the reaction mixture is a diol, having a molecular weight in the range of about 60 to about 800. Preferably, the diol is selected from diethylene glycol (DEG), ethylene glycol (EG), polyethylene glycol (PEG), tetraethylene glycol (TETEG), methoxypolyethylene glycol (MPEG), 1,4 butanediol (1,4 BDO), propylene glycol (PG), dipropylene glycol (DPG) and triethylene glycol (TEG). The third hydric component of the reaction mixture is selected from: (1) polyoxyalkylene diols chain terminated with ethylene oxide, having a molecular weight in the range of about 500 to about 4000, and (2) polyfunctional polyols chain terminated with propylene oxide, having a molecular weight in the range of about 250 to 1000.

In the reaction mixture, the ratio of NCO to OH groups for the polyisocyanate and the triols, diols, and polyfunctional polyols is at least about 0.5:1. The proportion of diols, triols, and polyfunctional polyols in the mixture is in the range of about 15 to about 40% of the poly(oxyalkylene) triol, in the range of about 5 to about 60% of the diol, and in the range of about 0 to about 60% of the poly(oxyalkylene) diol and polyfunctional polyol, based on the total weight of the diols, triols, and polyfunctional polyols. Thus, only the poly (oxyalkylene) diols and polyfunctional polyols are optional components.

According to another embodiment of the invention, there is provided a water blown, open cell hydrophilic polyurethane foam. This foam is the reaction product of the above described mixture comprising an organic polyisocyanate, water, a reaction catalyst, diols, and polyols. According to yet another embodiment of the invention, there is provided an article of manufacture utilizing the polyurethane foam.

DETAILED DESCRIPTION OF THE INVENTION

Suitable organic polyisocyanates are any that when utilized in the process of the present invention will yield the desired open cell, hydrophilic polyurethane foam. Examples of suitable organic polyisocyanates include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'bis-toluene-4,4'-diisocyanate, hexamethylene diisocyanate, napthalene-1,5-diisocyanate polymethylene polyphenylene isocyanate, mixtures thereof and the like. The preferred organic polyisocyanate is polymethylene polyphenylene isocyanate.

The amount of polyisocyanate employed in the present invention is any amount suitable to obtain the desired open cell, hydrophilic polyurethane foam. Generally, the amount of polyisocyanate employed in the process of this invention should be sufficient to provide at least about 0.5 NCO group per hydroxyl group present in the reaction system, which includes all the polyol reactants as well as any additive or forming agent employed. While an excess of isocyanate compound may be conveniently employed, it is generally undesirable due to the high cost of the isocyanate compounds. It is preferable, therefore, to employ sufficient isocyanate to provide no greater than about 1.10 NCO groups per hydroxyl group, preferably in the range of about 0.5 and about 0.9 NCO groups per hydroxyl group, more preferably in the range of about 0.5 to about 0.8 NCO groups per hydroxyl group, and most preferably in the range of about 0.58 to about 0.75 NCO groups per hydroxyl group.

Water generally will be utilized in the present invention in an amount sufficient to produce the desired polyurethane foam. Water is generally employed in an amount in the range of about 1 to 25 parts water per 100 parts by weight of the di- and polyhydric components. Preferably, water is utilized in the range of about 4 to about 15 parts water per 100 parts by weight of the di- and polyhydric components.

Generally any suitable catalyst may be utilized in the present invention as long as the desired polyurethane foam is produced. The catalyst employed may be any of the catalysts or mixtures of catalysts known to be useful for producing polyurethane foams by the one-step method. Such catalysts include for example, tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Preferably, a mixture comprised of a tertiary amine and a metallic salt is employed as a catalyst.

The amount of catalyst utilized in the present invention may be any amount that is suitable to yield the desired polyurethane foam. Generally, however, the polyurethane foams of the invention are prepared in the presence of a catalytic amount of a reaction catalyst. The catalyst or catalyst mixture, as the case may be, is usually employed in an amount in the range of about 0.05 and about 1.5, and preferably between about 0.10 and about 1.0 parts by weight per every 100 parts of total di- and polyhydric components.

The first polyol utilized in the present invention includes at least one poly(oxyalkylene) triol, chain terminated with propylene oxide and having a molecular weight in the range of about 2800 to about 6200. Preferably, the first polyol will have a molecular weight in the range of about 3000 to about 4500.

The second hydric component, a diol, has a molecular weight in the range of about 60 to about 800. Preferably, the molecular weight is in the range of about 60 to about 250, and most preferably in the range of about 62 to about 200. Suitable materials useful as the diol include aliphatic glycols such as for example, diethylene glycol (DEG), ethylene glycol (EG), polyethylene glycol (PEG), tetraethylene glycol (TETEG), methoxypolyethylene glycol (MPEG), 1,4 butanediol (1,4 BDO), propylene glycol (PG), dipropylene glycol (DPG) and triethylene glycol (TEG).

The third di- or polyhydric component utilized in the present invention includes at least one selected from the group consisting of (i) poly(oxyalkylene) diols chain terminated with ethylene oxide and having a molecular weight in the range of about 500 to about 4000 and (ii) polyfunctional polyols chain terminated with propylene oxide and having a molecular weight in the range of about 250 to about 1000. In the present invention, the third di- or polyhydric component is important in determining the structural characteristics of the polyurethane foam. Triols tend to make the polyurethane foam semi-rigid to rigid with decreasing molecular weight of the triol. Diols tend to make the polyurethane foam more flexible with increasing molecular weight of the diol.

The di- and polyhydric components are added to a reaction mixture, according to the present invention, in amounts sufficient to make the polyurethane foam of the invention. Based on the total weight of the diols, polyols, and polyfunctional polyols, the first polyol (a triol) is present in the reaction mixture in the range of from about 10 to about 50 wt. %; the diol is present in the range from about 5 to about 60 wt. %; and the optional third component (a poly(oxyalkylene) diol or polyfunctional polyol) is present in the range of from about 0 to about 60 wt. %. Preferably, the triol is present in the reaction mixture in the range of from about 15 to about 40 wt. % of the hydric components, with the balance comprising at least one component selected from the diol and the optional component that is either a poly(oxyalkylene) diol or a polyfunctional polyol. Most preferably, the triol is present in the range of from about 25 to about 40 wt. %. The remainder of the di- and polyhydric components then includes at least (1) a diol selected from those diols having a molecular weight in the range 60–250; and optionally either a poly(oxyalkylene) diol or a polyfunctional polyol.

In the preparation of the polyurethane foams of the invention, minor amounts of one or more conventional surfactants may be utilized in order to further improve the cell structure of the polyurethane foam. Typical of these are the silicon surfactants, e.g., the silicone oils and soaps and the siloxane-oxyalkylene block copolymers. U.S. Pat. No. 2,834,748 and T. H. Ferrigano, *Rigid Plastic Foams* (Reinhold Publishing Corp., N.Y., 1963), pp. 38–42 disclose various surfactants which are useful for this purpose, and are both herein incorporated by reference. Generally up to 2 parts by weight of the surfactants are employed per 100 parts of total diols and polyols, preferably between about 0.05 and about 1.5 parts.

Other surfactants may be utilized as emulsifiers in the present invention. These emulsifiers include ethoxylated alkylphenols, aliphatic alcohols and sulfated aliphatic alcohols, with molecular weights in the range of about 60 to about 3000, preferably in the range of about 300 to about 2000. Generally in the range of about 0.5 to about 50 parts by weight of the emulsifiers are employed per 100 parts of total diols and polyols, preferably between about 10 and about 30 parts.

Other materials which may be incorporated into the hydrophilic foamed compositions of the invention may also include additives such as pigments, colorants, synthetic fibers, mineral fillers, medicaments (to provide therapeutic character to the foams), plasticizers, absorbent charcoal, processing aids, antioxidants and perfumes. In addition, water retention agents, such as those disclosed in U.S. Pat. No. 4,426,462, herein incorporated by reference may be utilized in the present invention. Suitable retention agents include alkyl sulfate salts, such as sodium lauryl sulfate.

The polyurethane foams of the present invention may have any desired density. Generally, the polyurethane foams of the present invention will have a density in the range of about 0.7 lbs/ft$^3$ to about 4 lbs/ft$^3$. Preferably, the density will be in the range of about 0.8 lbs/ft$^3$ to about 2 lbs/ft$^3$, and most preferably in the range of about 0.8 lbs/ft$^3$ to about 1.2 lbs/ft$^3$.

The polyurethane foam of the present invention will have a water pick-up of at least about 30 volume percent. Preferably, the water pick-up is at least about 50 volume percent. The water pick-up is is determined by immersing a 2"×2"×2" sample in water for three minutes. The volume percent water pick-up is equal to 100 times the weight of water absorbed divided by the geometric volume of the sample in cm$^3$.

The polyurethane foam of the present invention will have a dripping tendency in the range of about 5 to about 60 volume percent. Preferably, the dripping tendency is in the range of about 5 to about 30 volume percent. The dripping tendency is determined by by immersing a 2"×2"×2" sample in water for three minutes. The quantity of water pick-up is determined and the weight of water which leaks from the corner of the sample in one minute is determined. The dripping tendency equals 100 times the weight of water lost divided by the weight of water absorbed.

The polyurethane foam of the present invention will have a percentage water retained in the range of about 5 to about 80 volume percent. Preferably, the percentage water retained is in the range of about 10 to about 60 volume percent.

EXAMPLES

Examples 1–17 were all prepared utilizing the following procedure, with the weight percent of the polyol components is shown in Table 1.

In each of the Examples 1–17, the foams were prepared by first preblending the polyol components in the respective ratios as shown in Table 1. At room temperature of about 75° F., the polyisocyanate was then blended into the reactant diol and polyol mixture for about 15 to 20 seconds and poured into a suitable open top container. The resultant foams were cured for a period of 72 hours prior to testing. In Table I, "EO term." and "PO term." refer to ethylene oxide and propylene oxide terminated respectively.

TABLE I

HYDROPHILIC FOAM

| | EX 1 | EX 2 | EX 3 | EX 4 | EX 5 | EX 6 | EX 7 | EX 8 | EX 9 | EX 10 | EX 11 | EX 12 | EX 13 | EX 14 | EX 15 | EX 16 | EX 17 | EX 18 |
|---|---|---|---|---|---|---|---|---|---|---|---|---|---|---|---|---|---|---|
| Polyol (3000 MW Triol PO Term) | 30 | 37 | 34 | 30 | 20 | 31 | 20 | 30 | 20 | 30 | 30 | 30 | 28 | 28 | 28 | 28 | 20 | 25 |
| Polyol 2 (1000 MW Diol EO Term) | 10 | 10 | 10 | | | | | 13 | 10 | 10 | 10 | 10 | 10 | 10 | 10 | 10 | | |
| Polyol 3 (700 MW Triol PO Term.) | 20 | 26 | 23 | 4 | 20 | 30 | | | | 20 | 25 | 20 | 17 | 17 | 12 | 12 | | 11 |
| Polyol 4 (106 MW Diol EO Term.) | 30 | | 15 | | 15 | | 35 | 14 | 30 | | | | | | | | 35 | |
| Polyol 5 (62 MW Diol EO Term.) | | 17 | 8 | | 29 | | | | | | | | | | | | | |
| Polyol 6 (2000 MW Diol EO Term.) | | | | | | | 35 | | 30 | | | | | | | | | |
| Polyol 7 (200 MW Diol EO Term.) | | | | 56 | | | | | | | | | | | | | | |
| Polyol 8 (400 MW Amino EO Term.) | | | | | | | | 14 | | | | | | | | | | 57 |
| Ethoxylated Surfactant (600–1600 MW) | | | | | | | | 20 | | | | | | | | | | |
| Polyol 12 (90 MW Diol) | | | | | | | | | | 30 | | | | | | | | |
| Polyol 13 (76 MW Diol) | | | | | | | | | | | 25 | | | | | | | |
| Polyol 14 (130 MW Diol) | | | | | | | | | | | | 30 | | | | | | |
| Polyol 15 (150 MW Triol) | | | | | | | | | | | | | 35 | | | | | |
| Polyol 16 (194 MW Tetrol) | | | | | | | | | | | | | | 40 | | | | |
| Polyol 17 (750 MW Monomeric) | | | | | | | | | | | | | | | 40 | | | |
| Polyol 18 (350 MW Monomeric) | | | | | | | | | | | | | | | | 35 | | |
| Polyol 19 (4000 MW Diol) | | | | | | | | | | | | | | | | | | |
| Urethane Catalyst | 0.5 | 0.5 | 0.5 | 0.5 | 0.5 | 0.5 | 0.5 | 3 | 0.5 | .5 | .5 | .5 | .5 | .5 | .5 | .5 | .5 | 3 |
| Silicone Oil | 0.5 | 0.5 | 0.5 | 0.5 | 0.5 | 0.5 | 0.5 | 1 | 0.5 | .5 | .5 | .5 | .5 | .5 | .5 | .5 | .5 | 1 |
| Water | 9 | 9 | 9 | 9 | 9 | 9 | 9 | 6 | 9 | 9 | 99 | 9 | 9 | 9 | 9 | 9 | 9 | 6 |
| Isocyanate | 133 | 133 | 133 | 133 | 133 | 133 | 133 | 110 | 133 | 133 | 133 | 133 | 133 | 133 | 133 | 133 | 133 | 133 |
| NCO:OH Ratio | 0.6:1 | 0.58:1 | 0.59:1 | 0.7:1 | 0.5:1 | 0.5.1 | 0.59:1 | 0.74:1 | 0.5:7 | 0.6:1 | 0.6:1 | 0.58:1 | 0.57:1 | 0.59:1 | 0.56:1 | 0.58:1 | 0.6:1 | 0.6:1 |
| Density | 1.15 | 1.1 | 1.15 | 1.2 | 1.18 | 1.15 | 1.2 | 1 | 1.15 | 1.8 | 1.6 | 1.5 | 1.6 | 1.57 | | | | |
| Water Pick-up (3 min) | 73 | 61 | 75 | 59 | 79 | 80 | 02 | 92 | 91 | 58 | 45 | 66 | 63 | 46 | 41 | 63 | 90 | 72 |
| Dripping Tendency | 18 | 13 | 16 | 19 | 28 | 18 | 45 | 30 | 40 | 8 | 24 | 7 | 29 | 25 | 55 | 45 | 35 | 21 |
| Water Retained, % | 65 | 50 | 51 | 48 | 66 | 65 | 61 | 65 | 63 | 54 | 39 | 62 | 45 | 34 | 9 | 30 | 62 | 64 |
| Utility* | F | F | F | F | F | F | M,D,FL | F,S | M,D,FL | F,S | F,S | F,S | F,S | F,S | F,S | F,S | M,D,FL | F,S |
| Type** | SR | SR | SR | SR | R | R | F | SR | F | SR | R | R | R | R | R | R | | F |

*Floral, Diapers, Filters, Spill control, Medical

I claim:

1. A water blown, open cell, hydrophilic polyurethane foam having a density between about 0.7 to about 2.0 lb/ft³, said foam being the reaction product of:
   (a) an organic polyisocyanate;
   (b) water;
   (c) a reaction catalyst;
   (d) a poly(oxyalkylene) triol, chain terminated with propylene oxide and having a molecular weight in the range of about 2800 to about 6200;
   (e) a diol selected from the group consisting of diethylene glycol, ethylene glycol, polyethylene glycol, tetraethylene glycol, 1,4-butanediol, propylene glycol, and triethylene glycol, said diol having a molecular weight in the range of about 60 to about 250; and
   (f) a polyol selected from the group consisting of (i) poly(oxyalkylene) diols, chain terminated with ethylene oxide and having a molecular weight in the range of about 500 to about 4000, and (ii) polyfunctional polyols, chain terminated with propylene oxide and having a molecular weight in the range of about 250 to about 1000;

wherein the ratio of NCO to OH groups for the polyisocyanate, diols and polyols is at least about 0.5:1, and wherein about 10 to about 40 wt. %, of the total weight of the diols and the polyols is (d), about 5 to about 60 wt. % is (e), and about 4 to about 60 wt. % is (f).

2. The foam of claim 1, wherein about 35 to about 60 wt. % of the total weight of the diols and polyols of components (d), (e), and (f) is component (f).

3. The foam of claim 1 wherein the ratio of NCO to OH groups for the polyisocyanate and the polyols is in the range of about 0.5:1 to about 0.9:1.

4. The foam of claim 1 wherein the reaction mixture from which the reaction product is formed comprises in the range of about 5 to 25 parts water by weight per 100 parts of diols and polyols.

5. The foam of claim 1 wherein the triol (d) has a molecular weight in the range of about 3000 to about 4500.

6. The foam of claim 1 wherein the triol component (d) is between about 15 to about 40 wt. % of the total weight of the diols and polyols.

7. The foam of claim 1 wherein the organic polyisocyanate is polymethylene polyphenylene isocyanate.

8. The foam of claim 1 wherein the ratio of NCO to OH groups for the polyisocyanate, the diols and polyols is in the range of about 0.5:1 to about 0.75:1.

9. A process for preparing a water blown, open cell, hydrophilic polyurethane foam having a density between about 0.7 and about 2.0 lb/ft$^3$, said process comprising:

(i) reacting in one step a reaction mixture comprising:
(a) an organic polyisocyanate;
(b) water;
(c) a reaction catalyst;
(d) a poly(oxyalkylene) triol, chain terminated with propylene oxide a having a molecular weight in the range of about 2800 to about 6200;
(e) a diol selected from the group consisting of diethylene glycol, ethylene glycol, polyethylene glycol, tetraethylene glycol, 1,4-butanediol, propylene glycol, and triethylene glycol, said diol having a molecular weight in the range of about 60 to about 250; and
(f) a composition selected from the group consisting of (i) poly(oxyalkylene) diols chain terminated with ethylene oxide and having a molecular weight in the range of about 500 to about 4000, and (ii) polyfunctional polyols, chain terminated with propylene oxide and having a molecular weight in the range of about 250 to about 1000;
wherein the ratio of NCO to OH groups for the polyisocyanate, diol and polyols is in the range of about 0.5:1 to about 0.9:1, and wherein about 10 to about 40 wt. % of the total weight of the diols and polyols of components (d), (e), and (f) is (d), about 5 to about 60 wt. % is (e), and about 4 to about 60 wt. % is (f); and (ii) producing a water blown, open cell, hydrophilic polyurethane foam of said density.

10. The process of claim 9, wherein about 35 to about 60 wt. % of the total weight of the diols and polyols of components (d), (e), and (f) is component (f).

11. The process of claim 9 wherein the triol (d) is in the range of about 15 to 40 wt. %, based on the total weight of diols and polyols.

12. The process of claim 9 wherein the ratio of NCO to OH groups for the polyisocyanate and the diols and polyols is in the range of about 0.5:1 to about 0.8:1.

13. The process of claim 9 wherein the reaction mixture comprises in the range of about 5 to about 25 parts water by weight per 100 parts of diols and polyols.

14. The process of claim 9 wherein the the triol (d) has a molecular weight in the range of about 3000 to about 4500.

15. The process of claim 9 wherein the organic polyisocyanate is polymethylene polyphenylene isocyanate.

16. The process of claim 9 wherein the ratio of NCO to OH groups for the polyisocyanate and the diols and polyols is in the range of about 0.58:1 to about 0.75:1.

17. An article of manufacture comprising a water blown, open cell, hydrophilic polyurethane foam having a density between about 0.7 and about 2.0 lb/ft$^3$, said polyurethane being the reaction product of:

(a) an organic polyisocyanate;
(b) water;
(c) a reaction catalyst;
(d) a poly(oxyalkylene) triol, chain terminated with propylene oxide and having a molecular weight in the range of about 2800 to about 6200;
(e) a diol selected from the group consisting of diethylene glycol, ethylene glycol, polyethylene glycol, tetraethylene glycol, 1,4-butanediol, propylene glycol, dipropylene glycol, and triethylene glycol, said diol having a molecular weight in the range of about 60 to about 250; and
(f) a poly(oxyalkylene) diol chain terminated with ethylene oxide and having a molecular weight in the range of about 500 to about 4000;
wherein the ratio of NCO to OH groups for the polyisocyanate, diols and polyols is in the range of about 0.5:1 to about 0.9:1, and further wherein about 10 to about 50 weight percent of the total weight of the diols and polyols of components (d), (e), and (f) is component (d), about 5 to about 60 wt. % is (e), and about 4 to about 60 wt. % is (f).

18. The article of claim 17, wherein about 35 to about 60 wt. % of the total weight of the diols and polyols of components (d), (e), and (f) is component (f).

19. The article of claim 17 wherein the ratio of NCO to OH groups for the polyisocyanate and the diols and polyols is in the range of about 0.5:1 to about 0.8:1.

20. The article of claim 17 wherein the reaction mixture from which the reaction product is formed comprises in the range of about 5 to 25 parts water by weight per 100 parts of diols and polyols.

21. The article of claim 17 wherein the triol (d) has a molecular weight in the range of about 3000 to about 4500.

22. The article of claim 17 wherein the triol component (d) is in the range of about 15 to about 40 wt. % of the total weight of diols and polyols.

23. The article of claim 17 wherein the organic polyisocyanate is polymethylene polyphenylene isocyanate.

24. The article of claim 23 wherein the ratio of NCO to OH groups for the polyisocyanate, diols and polyols is in the range of about 0.58:1 to about 0.75:1.

* * * * *

UNITED STATES PATENT AND TRADEMARK OFFICE
CERTIFICATE OF CORRECTION

PATENT NO. : 5,686,502          Page 1 of 2

DATED : November 11, 1997

INVENTOR(S) : Pat L. Murray; E. Richard Huber

It is certified that error appears in the above-identified patent and that said Letters Patent is hereby corrected as shown below:

Col. 3, line 7, "isocycanate" should be --isocyanate--.

Col. 3, line 8, after "issued" insert --February 15, 1997--.

Col. 3, line 22, "diisocycanate" should be --diisocyanate--.

Col. 4, line 16, after "1,5-diisocyanate" insert --,--.

Col. 6, line 31, delete "is", second occurrence.

Col. 6, line 40, delete "by", second occurrence.

In Table I, "Polyol 8 (400 MW Amino EO Term.)" should be --Polyol 8 (400 MW Amino PO Term.)--.

In Table I, after "*Floral, Diapers, Filters, Spill control, Medical" insert -- **SR=semirigid, R=rigid, F=flexible--.

After "Table I" insert Table II as follows:

Table II    Identification of Polyols

| Polyol (3000 MW Triol PO Term.) | Poly-G-32-56 of Olin |
|---|---|
| Polyol 2 (1000 MW Diol EO Term.) | Poly-G-55-112 of Olin |
| Polyol 3 (700 MW Triol PO Term.) | Poly-G-30-240 of Olin |
| Polyol 4 (106 MW Diol EO Term.) | Diethylene Glycol of Texaco Chemical |

UNITED STATES PATENT AND TRADEMARK OFFICE
CERTIFICATE OF CORRECTION

PATENT NO. : 5,686,502

DATED : November 11, 1997

INVENTOR(S) : Pat L. Murray; E. Richard Huber

It is certified that error appears in the above-identified patent and that said Letters Patent is hereby corrected as shown below:

| | |
|---|---|
| Polyol 5 (62 MW Diol EO Term.) | Ethylene Glycol of Texaco Chemical |
| Polyol 6 (2000 MW Diol EO Term.) | Poly-G-55-56 of Olin |
| Polyol 8 (400 MW Amino PO Term.) | Thanol 470X of Eastman |
| Polyol 12 (90 MW Diol) | 1,4-Butanediol of ISP, Inc. |
| Polyol 13 (76 MW Diol) | Propylene Glycol of Texaco Chemical |
| Polyol 14 (130 MW Diol) | Dipropylene Glycol of Texaco Chemical |
| Polyol 15 (150 MW Triol) | Tripropylene Glycol of Texaco Chemical |
| Polyol 16 (194 MW Tetrol) | Tetraethylene Glycol of Union Carbide |
| Polyol 17 (750 MW Monomeric) | Methoxy Carbowax 750 of Union Carbide |
| Polyol 18 (350 MW Monomeric) | Methoxy Carbowax 350 of Union Carbide |
| Polyol 19 (4000 MW Diol) | Poly-G-55-28 of Olin |

Signed and Sealed this

Twenty-first Day of April, 1998

Attest:

BRUCE LEHMAN

*Attesting Officer*  *Commissioner of Patents and Trademarks*